(12) United States Patent
Hueneke et al.

(10) Patent No.: US 8,343,290 B2
(45) Date of Patent: Jan. 1, 2013

(54) PROCESS FOR PRODUCING RUBBER SHEETS, RUBBER MATS OR SIMILAR RUBBER PRODUCTS FROM RUBBER GRANULES

(75) Inventors: Joerg Heinz Hueneke, Krefeld (DE); Michael Schoeler, Rheurdt (DE)

(73) Assignee: Siempelkamp Maschinen- und Anlagenbau GmbH & Co. KG, Krefeld (DE)

( * ) Notice: Subject to any disclaimer, the term of this patent is extended or adjusted under 35 U.S.C. 154(b) by 280 days.

(21) Appl. No.: 12/672,082

(22) PCT Filed: Aug. 27, 2008

(86) PCT No.: PCT/EP2008/007031
§ 371 (c)(1),
(2), (4) Date: May 12, 2010

(87) PCT Pub. No.: WO2009/027083
PCT Pub. Date: Mar. 5, 2009

(65) Prior Publication Data
US 2011/0024021 A1 Feb. 3, 2011

(30) Foreign Application Priority Data
Aug. 27, 2007 (DE) .......................... 10 2007 040 614

(51) Int. Cl.
*B29C 65/20* (2006.01)
*B32B 37/02* (2006.01)

(52) U.S. Cl. .................. 156/62.2; 264/113; 264/911
(58) Field of Classification Search .................. 156/62.2; 264/113, 123, 911, 912; 428/95
See application file for complete search history.

(56) References Cited

U.S. PATENT DOCUMENTS

| 4,239,577 A * | 12/1980 | Hartman et al. ............ 156/312 |
| 4,608,407 A * | 8/1986 | Kerimis et al. ............... 524/14 |
| 2005/0031829 A1* | 2/2005 | Crenshaw et al. ............ 428/95 |

FOREIGN PATENT DOCUMENTS

| DE | 102 718 | 12/1973 |
| DE | 3017899 | 11/1980 |
| DE | 4113056 | 10/1992 |
| JP | 2005074780 | 3/2005 |

\* cited by examiner

*Primary Examiner* — Michael Tolin
(74) *Attorney, Agent, or Firm* — Andrew Wilford

(57) ABSTRACT

A rubber sheet is made from rubber-containing granules by first coating the rubber granules with a binder, then forming the coated rubber granules into a mat having a core layer with a low moisture level of less than 5% and a pair of outer surface layers, and then, without substantially increasing the low moisture level in the core layer, setting in at least one of the outer layers a high moisture level of 10% to 50% by weight and thereby imparting to the mat an inhomogeneous moisture profile. The mat with the inhomogeneous moisture level is then hot-pressed with pressure and heat so as to vaporize moisture in the one outer layer and drive steam into the core layer, and the hot-pressed mat is cured.

13 Claims, No Drawings

PROCESS FOR PRODUCING RUBBER SHEETS, RUBBER MATS OR SIMILAR RUBBER PRODUCTS FROM RUBBER GRANULES

CROSS REFERENCE TO RELATED APPLICATIONS

This application is the US-national stage of PCT application PCT/EP2008/007031, filed 27 Aug. 2008, published 5 Mar. 2009 as WO2009/027083, and claiming the priority of German patent application 102007040614.4 itself filed 27 Aug. 2007.

FIELD OF THE INVENTION

The invention relates to a method of making rubber sheets, rubber mats, or similar rubber products from rubber granules in a press. According to the invention, rubber granules also refer to rubber powder or the like, and preferably a pourable or spreadable rubber recycled from used tires.

BACKGROUND OF THE INVENTION

Used tires and rubber from used tires are being generated as waste in ever-increasing quantities. The use of these waste materials is frequently problematic. A primary use is for energy recovery, for example by burning in cement manufacture. However, in particular as the result of regulatory restrictions, recycling is increasingly being required. It is known that granules, i.e. powders or meals, may be produced from used tires. The granules may be used, for example, as filler in the rubber industry. However, it is also known to produce molded parts and mats, i.e. sports surfaces and safety mats, from such rubber granules in molding presses.

A method is known from DE 30 17 899, for example, of making PUR-bound rubber granule mats, where rubber granules from used tires, for example as the main component, and a polyurethane-based binder, catalyst, and other auxiliary materials and additives are deformed under pressure and heat in a continuous press. Conveyor belt speeds of 6 to 8 m per minute, pressures of 1 to 3 bar, and temperatures of 120 to 140° C. are selected. When the mat-forming mixture enters the belt molding machine, steam may be blown in to accelerate curing.

A disadvantage of the known methods of making rubber sheets, rubber mats, or the like from rubber granules from used tires is that very long press cycles are frequently necessary. This is due to the very poor thermal conductivity of rubber. Heating time factors for sheet rubber materials are typically 60 sec per mm of product thickness. For thicker products, heat-through times of several hours are necessary. For this reason the manufacture of various products from rubber granules from used tires is often uneconomical. These problems are addressed by the invention.

OBJECT OF THE INVENTION

The object of the invention is to provide a method of making rubber sheets, rubber mats, or similar rubber products from rubber granules, preferably rubber granules from used tires, in a press, and characterized by short production times and therefore high cost-effectiveness.

SUMMARY OF THE INVENTION

To attain this object, the invention teaches a method of making rubber sheets, rubber mats, or similar rubber products from rubber granules, preferably rubber granules from used tires, in a press, wherein the rubber granules are coated with at least one binder, and a pressed material mat is produced from the coated granules, wherein a moisture level higher than in other mat regions is set at least in the region of the surfaces of the pressed material mat or in at least one outer layer close to the surface, and wherein the pressed material mat having a moisture profile that is inhomogeneous over the mat thickness is introduced into a press and is pressed to form a rubber sheet in the press by means of pressure and heat, with curing of the binder. A higher moisture level is preferably set in the (two) outer layers of the pressed material mat close to the surface than in a core layer in the interior of the mat. The binder is preferably isocyanate or a binder containing isocyanate.

Thus, the invention is based on the discovery that rubber sheets or mats may be produced with particularly short pressing times, and thus in a particularly economical manner, when the outer layer or layers have a higher moisture level than the core layer. This is because the water in the moist outer layers evaporates during the heating, for example upon contact with the hot press plates, thus producing steam in the outer layers which quickly passes into the less moist core layer or layers. Thus, within the scope of the invention not only is there rapid heating and thus curing of the outer layers, but also as the result of the rapid heat transport into the core layer via the steam the core layer is also quickly heated, so that the binder likewise cures very quickly at that location. This effect, also referred to as the "steam shock effect," has been previously observed during pressing of wood materials into wood material panels, for example particle board, fiber board, or the like. Surprisingly, as the result of a suitable moisture level in the outer layers it is also possible to optimize the production of rubber sheets, rubber mats, or the like. Of particular importance is the fact that the rubber granules or the surfaces thereof do not have to be melted by heat in order to ensure a proper bond. Rather, by means of the steam which penetrates the mat it is entirely sufficient to heat the adhesive adhering to the surfaces, thus enabling curing. In this regard a particularly high pressure is not necessary for bonding the sheet. The pressure applied by the press should in particular optimize the heat transfer, high pressures together with finely grained material generally resulting in high surface quality.

DETAILED DESCRIPTION

The moisture may be produced or introduced in various ways. First of all, it is possible to set the inhomogeneous moisture profile using coated rubber granules having different moisture levels. In this manner a multilayer, for example a three-layer, strewn-particle mat may be formed, where rubber granules with a high moisture content are used for the outer layers while rubber granules with a very low moisture content are used for the core layer. Outer and core layers are not limited to a three-layer structure. Multiple outer layers and multiple core layers may also be provided. Furthermore, with regard to a multilayer structure it is also possible to use rubber granules of different grain sizes for the various layers. In addition, rubber granules having different densities may be used for the various layers.

If a monolayer structure is selected, or, for a multilayer structure, if a strewn-particle mat with a homogeneous moisture level is used, another possibility is to set the desired reaction moisture level by supplying moisture or wetting the surface. For this purpose, for example before introduction into the press, steam may be blown into the strewn-particle mat. Within the scope of the invention, "steam" also refers to a steam/air mixture. In principle, spray dampening or the like is also suitable.

In any case, according to the preferred embodiment of the invention it is advantageous when the water content in the outer layer or layers is 10% to 50%, preferably 20% to 30%, in each case relative to the weight. In contrast, the core layer or layers should be relatively dry. In each case the water content should be lower than in the outer layers, since the steam shock effect is greater when a particularly high moisture drop occurs from the outer layers to the core layer. In addition, the steam shock effect is increased when high temperature differences are present from the outer layer to the core layer. In this regard it is advantageous when the water content in the core layer or layers is less than 10%, preferably less than 5%, for example less than 1%.

The pressed material mat is particularly preferably pressed in a continuous press, thus allowing production to be carried out continuously, and thus in a particularly economical manner. Continuous presses are known not only for making rubber sheets, rubber mats, or the like, but also in particular for making wood material panels. In their basic design, continuous presses typically comprise an upper press part with an upper heating platen and a lower press part with a lower heating platen, and continuously circulating press belts, for example steel press belts, in both the upper press part and lower press part. These continuous press belts are guided over deflection rollers, and are supported against the heated press plates with roller units, for example roll stands, in between.

However, the invention also encompasses embodiments in which the pressed material mats are pressed in batch presses. In this regard platen presses, for example single- or multi-platen presses, may be used.

The pressed material mats are preferably pressed, at least temporarily, with a pressing pressure of 10 bar to 60 bar, for example 20 bar to 50 bar. Temperatures of 150° C. to 200° C., for example 160° C. to 180° C., are preferably set within the press.

Isocyanates are preferably used as binder. Commonly known isocyanates may be used. For a multilayer strewn-particle mat, the invention provides that different isocyanates, i.e. binders, are used in the outer layer or layers on the one hand than in the core layer or layers on the other hand. It is practical for the isocyanate used in the core layer to have a higher reactivity than the isocyanate used in the outer layer. In this regard, the rapid isocyanate may be a two-component isocyanate together with polyol. The invention is based on the recognition that customary isocyanate basically cures with appropriate heat treatment. The invention is further based on the fact that curing may be accelerated by adding water. Because curing is often problematic in the core layers in particular, it is advantageous to also use polyol or the like in the core layer to further improve the is reactivity and thus the curing.

As a whole, particularly rapid pressing of the rubber granule mats is achieved within the scope of the invention. By use of an (accelerated) isocyanate which cures at temperatures below 100° C., for example at between 85° C. and 90° C., there is the further possibility that the core layer does not have to be heated to temperatures above 100° C. In addition to the time factor, this has the advantage that no additional steam is produced in the core layer, so that there is also no appreciable buildup of steam pressure, and therefore the risk of "bursting" in the core layer is minimized. Within the scope of the invention, steam is primarily produced in the outer layers, and then penetrates into the core layer and condenses at that location, with heating of the core layer. Since rubber, unlike wood materials, does not exhibit swelling behavior, there is no adverse effect if some water remains inside the sheet.

A rubber granule sheet or mat may be produced as follows, for example:

First, in a mixer or the like the rubber granules produced from used tires are coated with the binder, for example isocyanate. In terms of equipment, conventional mixers from the wood material paneling industry may be used here. This mixture is spread to form a strewn-particle mat, using a suitable strewing device. For a three-layer structure, on the one hand rubber granules are coated with a standard isocyanate, and on the other hand rubber granules are coated with a highly reactive rapid isocyanate. From these two mixtures a multilayer, for example a three-layer, strewn-particle mat is produced, the mixture containing rapid isocyanate being used for the core layer, while the granules coated with standard isocyanate are used for the two is outer layers. Before or after strewing the outer layers, a outer-layer moisture level of 25% by weight of water is produced, while the moisture level in the core layer is approximately 0%. The pressed material mat produced in this manner is introduced into a continuous press where the mat is pressed at temperatures of 160 to 180° C. and a pressure of 20 to 50 bar. This results in heating time factors of 6 to 10 seconds per mm. In the illustrated embodiment the thickness of the produced sheet is 5 mm to 60 mm. Greater thicknesses are possible. The density may be set in a range of approximately 600 to 1000 kg/m$^2$ by means of the applied pressing pressure. The sheet is thus pressed in approximately 3 to 4 minutes.

The sheets, mats, or the like produced according to the invention may be used in many ways, for example as a ground covering for sports fields and playgrounds, container bases, safety mats, hall floors, and street and sidewalk surfacing.

The invention claimed is:

1. A method of making a rubber sheet from rubber-containing granules, the method comprising the steps of sequentially:
   coating the rubber granules with a binder;
   forming the coated rubber granules into a mat having a core layer with a low moisture level of less than 5% and a pair of outer surface layers;
   without substantially increasing the low moisture level in the core layer, setting in at least one of the outer layers a high moisture level of 10% to 50% by weight and thereby imparting to the mat an inhomogeneous moisture profile;
   hot-pressing the mat with the inhomogeneous moisture level with pressure and heat so as to vaporize moisture in the one outer layer and drive steam into the core layer; and
   curing the hot-pressed mat.

2. The method according to claim 1 wherein coated rubber granules having different moisture contents are used to provide the high and low moisture levels.

3. The method according to claim 1 wherein moisture steam is introduced into the at least one outer layer of the mat to provide moisture thereto.

4. The method according to claim 1 wherein the binder is or contains isocyanate.

5. The method according to claim 4, wherein a first isocyanate or binder containing isocyanate is used in the at least one outer layers, and a second isocyanate or binder containing isocyanate is used in the core layer, the second binder having a higher reactivity than the first binder.

6. The method according to claim 1 wherein the layers have different densities or different moisture levels or different granule grain sizes or different binders.

7. The method according to claim 1 wherein the mat is pressed in a continuous press.

8. The method according to claim 1 wherein the mat is pressed in a batch press.

9. The sheet-making method defined in claim 1 wherein the high moisture level is set in both of the outer layers.

10. The sheet-making method defined in claim 1 wherein the mat is pressed with a pressure of 10 to 60 bar.

11. The sheet-making method defined in claim 1 wherein the mat is pressed at a temperature of 150° C. to 200° C.

12. The sheet-making method defined in claim 1, further wherein the binder contains isocyanate but the isocyanate applied to the granules forming the core layer has a higher reactivity than the isocyanate applied to the granules forming the outer layers.

13. The sheet-making method defined in claim 1 wherein the granules are of recycled tires.

* * * * *